(12) United States Patent
Duncan

(10) Patent No.: US 6,257,380 B1
(45) Date of Patent: Jul. 10, 2001

(54) CALIBRATED HYSTERESIS BRAKES

(75) Inventor: John E. Duncan, Williamsville, NY (US)

(73) Assignee: Magtrol, Inc., Buffalo, NY (US)

(*) Notice: Subject to any disclaimer, the term of this patent is extended or adjusted under 35 U.S.C. 154(b) by 0 days.

(21) Appl. No.: 09/613,860

(22) Filed: Jul. 11, 2000

Related U.S. Application Data

(63) Continuation of application No. 08/168,513, filed on Dec. 16, 1993, now abandoned, which is a continuation of application No. 07/850,120, filed on Mar. 12, 1992, now abandoned.

(51) Int. Cl.⁷ ..................................................... B60T 13/04
(52) U.S. Cl. ............................................. 188/162; 310/105
(58) Field of Search ........................... 310/105; 188/265, 188/158, 159, 161, 162, 71.5

(56) References Cited

U.S. PATENT DOCUMENTS

| | | | |
|---|---|---|---|
| 3,229,132 | 1/1966 | Cohen et al. | 310/105 |
| 3,700,941 | 10/1972 | Duncan | 310/105 |
| 3,890,515 | 6/1975 | Fehr et al. | 310/105 |
| 4,848,526 | 7/1989 | Fargier et al. | 188/71.5 |

*Primary Examiner*—Matthew C. Graham
(74) *Attorney, Agent, or Firm*—Joseph P. Gastel

(57) ABSTRACT

A hysteresis brake including a casing having internal alternating first slots and first teeth, a pole having external alternating second slots and second teeth, a rotor including an annular portion located in spaced relationship between the casing and pole, and structure for permitting the pole and casing to be rotationally adjusted relative to each other and to lock the first slots and teeth of the casing in a rotationally adjusted position relative to the second slots and teeth of the pole to cause the brake to provide a torque output of a substantially predetermined value at a predetermined current. A method of calibrating a hysteresis brake to provide a torque of a substantially predetermined value at a predetermined current including the steps of rotating the casing and pole relative to each other to a position which provides substantially the desired torque at the predetermined current, and locking the casing and pole to each other in that position.

18 Claims, 3 Drawing Sheets

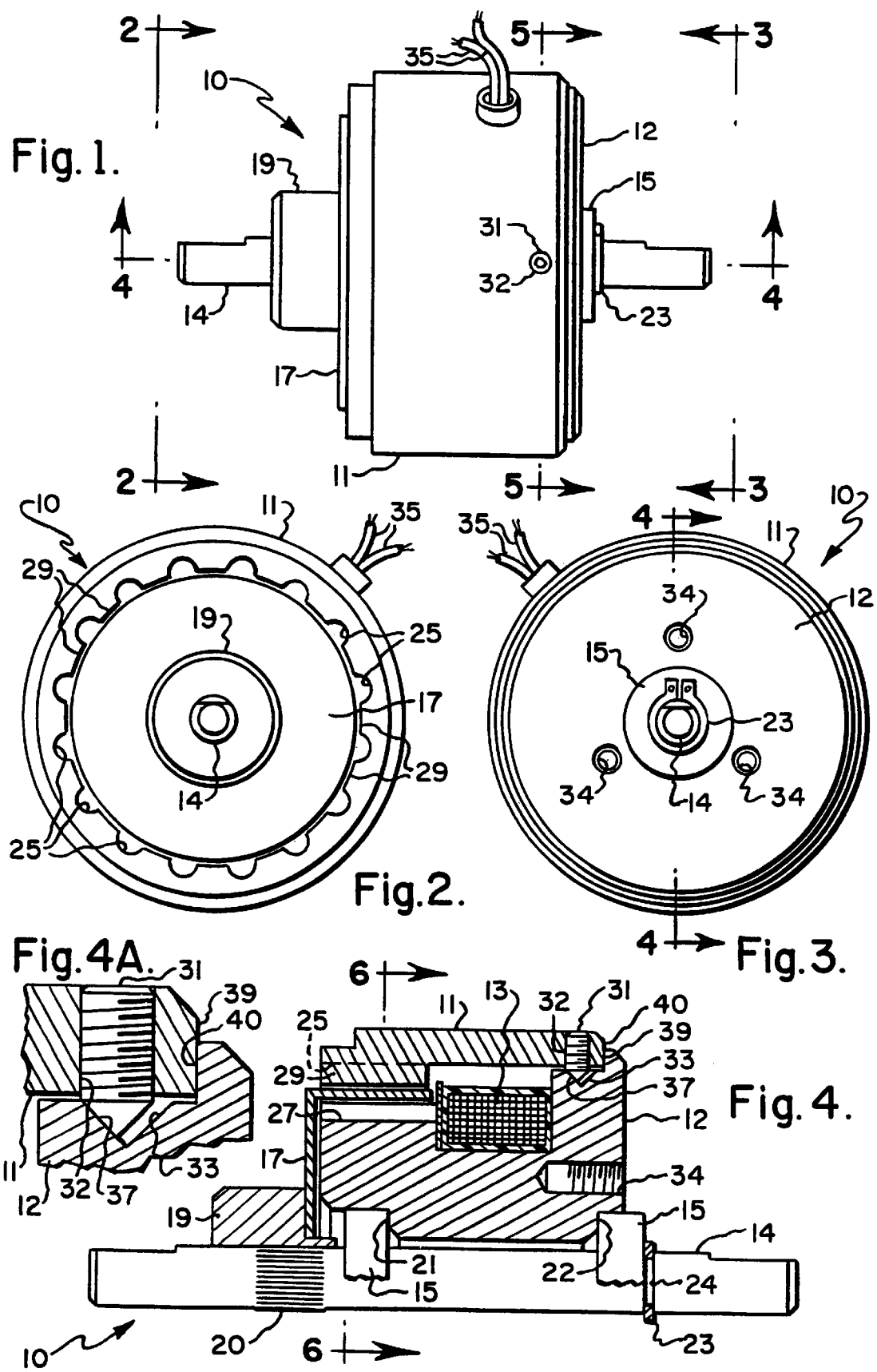

Fig. 10.
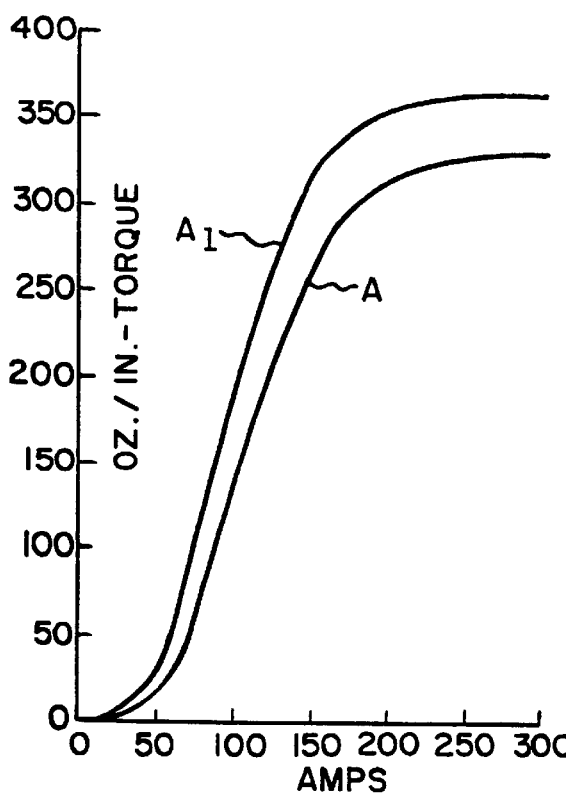
Fig. 11.
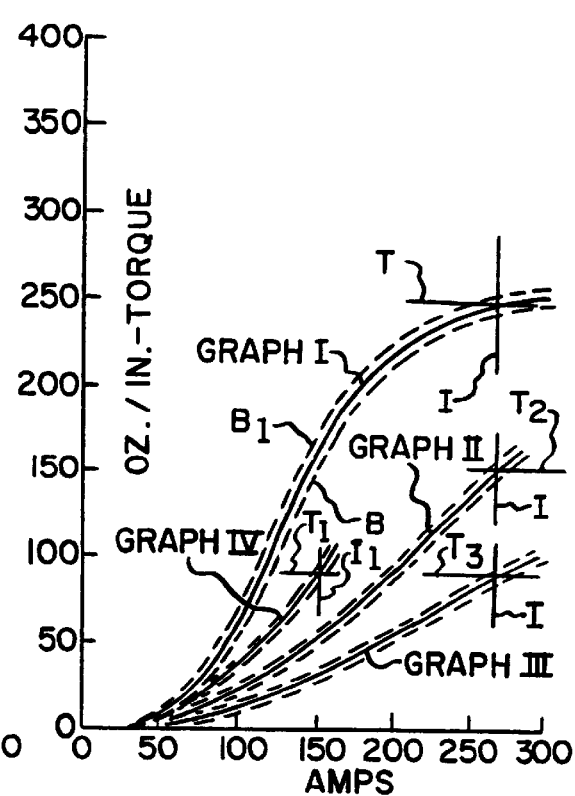
Fig. 12.
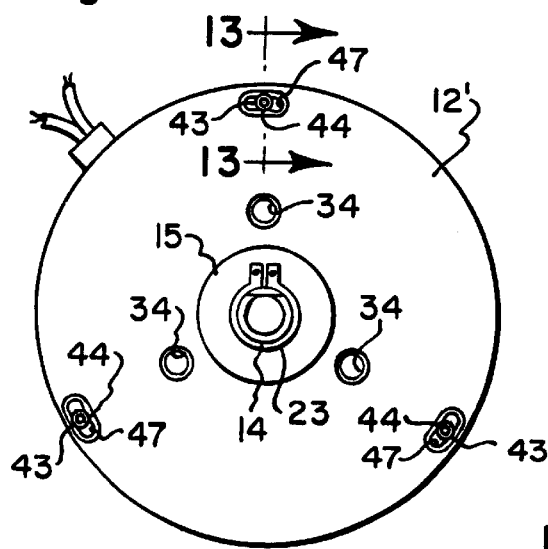
Fig. 14.
Fig. 13.
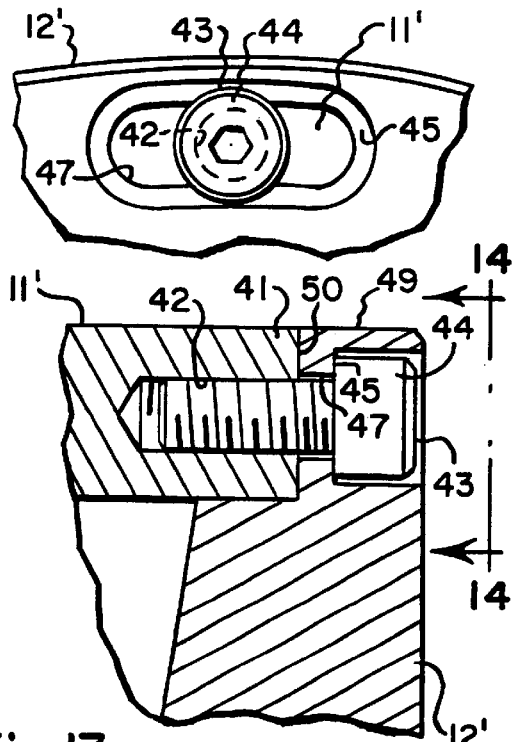

CALIBRATED HYSTERESIS BRAKES

This application is a continuation of Ser. No. 08/168,513 Dec. 16, 1993 now abandoned which is continuation of Ser. No. 07/850,120 Mar. 12, 1992 ABN.

BACKGROUND OF THE INVENTION

The present invention relates to an improved hysteresis brake and to a method of calibration thereof.

By way of background, in the past, hysteresis brakes varied in torque output at the same current inputs even though they were of the same size and construction and had their poles and casings oriented identically. This created a problem in applications where it was required that their torque outputs had to be within certain tolerances at their range of current inputs.

SUMMARY OF THE INVENTION

It is accordingly the primary object of the present invention to provide an improved hysteresis brake having structure which permits it to be calibrated to provide a torque output of a substantially predetermined value at a predetermined maximum operating current input whereby its torque output throughout its range of operation will not vary appreciably from a predetermined hysteresis curve for hysteresis brakes of the same size having the same construction.

Another object of the present invention is to provide an improved hysteresis brake having structure which permits it to be calibrated simply and efficiently to produce a torque output of a substantially predetermined value at a predetermined maximum current input.

A further object of the present invention is to provide a method of calibrating a hysteresis brake to provide a torque of a substantially predetermined value at a predetermined current input. Other objects and attendant advantages of the present invention will readily be perceived hereafter.

The present invention relates to a hysteresis brake comprising a casing, internal alternating first slots and first teeth on said casing, a pole, external alternating second slots and second teeth on said pole, said first slots and teeth being spaced radially outwardly from said second slots and teeth, a rotor including an annular portion spaced between said first and second slots and teeth, and locking means for locking said pole in a circumferentially adjusted position relative to said casing to cause said first and second poles and slots to be located relative to each other to produce a torque of a substantially predetermined value at a predetermined current.

The present invention also relates to a method of calibrating a hysteresis brake to produce a torque output of a substantially predetermined value at a predetermined current input, comprising the steps of providing a hysteresis brake having a casing and a pole, selecting a current generally below which said brake is to operate, rotating said casing and pole relative to each other to a position which will produce a torque of a substantially predetermined value at said selected current, and locking said casing and pole in said position.

The various aspects of the present invention will be more fully understood when the following portions of the specification are read in conjunction with the accompanying drawings wherein:

BRIEF DESCRIPTION OF THE DRAWINGS

FIG. 1 is a side elevational view of the improved hysteresis brake of the present invention;

FIG. 2 is an end elevational view taken substantially in the direction of arrows 2—2 of FIG. 1;

FIG. 3 is an end elevational view taken substantially in the direction of arrows 3—3 of FIG. 1;

FIG. 4 is a fragmentary cross sectional view taken substantially along line 4—4 of FIG. 3;

FIG. 4A is a fragmentary enlarged view of a portion of FIG. 4;

FIG. 10 is a graph showing the variation in torques produced at various current inputs for two substantially identical hysteresis brakes;

FIG. 11 includes a plurality of graphs with each graph depicting the range of variations in torque at given input currents when the casings and poles of a number of substantially identical hysteresis brakes are each adjusted relative to each other to provide a predetermined torque outputs at predetermined substantially maximum currents at which the brakes are to operate;

FIG. 12 is an end elevational view similar to FIG. 3 but showing another embodiment for adjusting the pole and casing of a hysteresis brake relative to each other;

FIG. 13 is an enlarged fragmentary cross sectional view taken along line 13—13 FIG. 12; and FIG. 14 is a fragmentary end elevational view taken substantially in the direction of the arrows 14—14 of FIG. 13.

DESCRIPTION OF THE PREFERRED EMBODIMENTS

Figure 5:
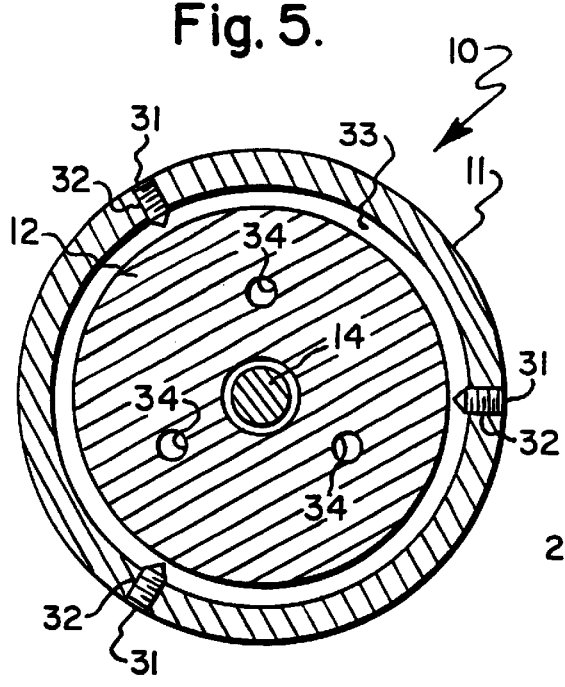
FIG. 5 is a cross sectional view taken substantially along line 5—5 of FIG. 1 and showing the structure for securing the casing and pole in predetermined positions relative to each other.
Figure 6:
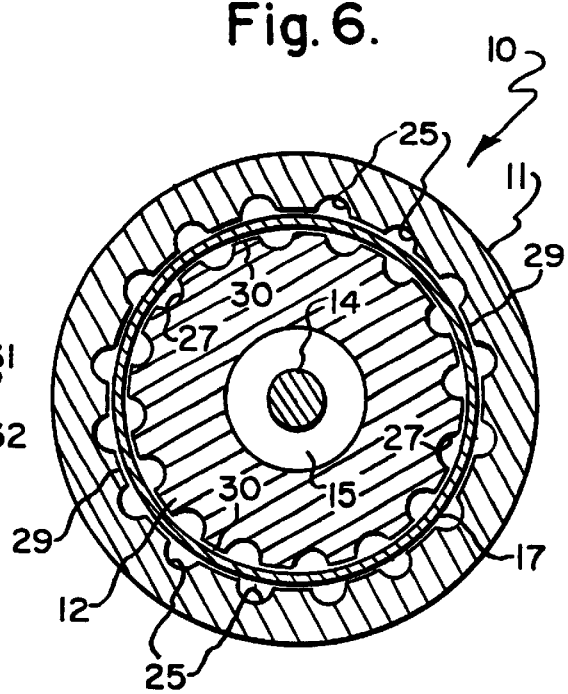
FIG. 6 is a cross sectional view taken substantially along line 6—6 of FIG. 4 and showing the casing and pole in an adjusted position for providing a predetermined torque at a predetermined current input.

Summarizing briefly in advance, the improved hysteresis brake 10 of the present invention has its casing 11 locked in a rotationally adjusted position relative to its pole 12 so that it will produce a substantially predetermined torque at a predetermined substantially maximum current input for which it is intended to operate. As noted briefly above, even if the casing and pole of substantially identical hysteresis brakes are at the same angular orientation, they may produce different torques at the same current inputs. This is due to variations in manufacturing tolerances and variations in magnetic characteristics of the materials. This is graphically depicted in FIG. 10 wherein curves A and A' show a plot of torque versus current input for two hysteresis brakes which are of the same size, made of nominally the same materials and adjusted so that each of their poles bear a specific angular orientation relative to their respective casings.

The improved hysteresis brake 10 of the present invention is standardized so that it will provide a substantially predetermined torque output characteristic within a narrow range throughout its operable current range, and this torque output will not vary substantially from other like hysteresis brakes which have been similarly standardized. This is depicted in FIG. 11 wherein the range of torques of a plurality of hysteresis brakes vary between lines B and $B_1$ when they have been calibrated at a current I to give torques substantially at T. This range is much closer than the range which is obtainable by orienting the pole and casing of each brake relative to each other in the same predetermined given angular orientation.

Structurally, the hysteresis brake 10 includes a casing 11, a pole 12, a winding 13 on pole 12, a shaft 14 mounted within bearings 15 within pole 12, and a rotor 17 secured to shaft 14 by collar 19. Collar 19 is fixed to shaft 14 at serrated portion 20. The left bearing 15 bears against a shoulder 21 of pole 12. The right bearing 15 bears against a shoulder 22 of pole 12, and a C-clip 23 is located in shaft groove 24 and bears against the right bearing 15 to maintain the shaft and rotor assembly in position within pole 12. All of the foregoing structure is conventional.

Figure 7:
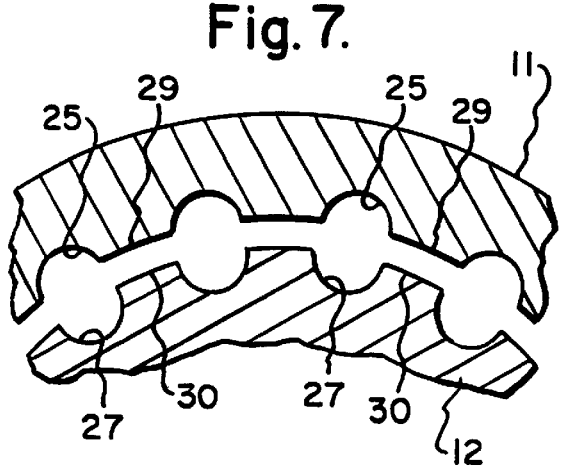
FIG. 7 is a fragmentary cross sectional view showing the orientation between a casing and pole which will provide minimum torque.
Figure 8:
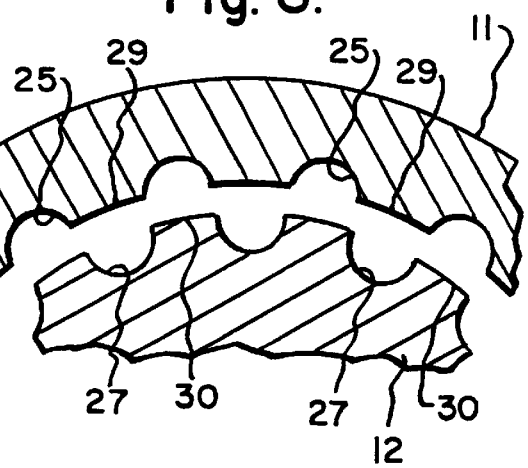
FIG. 8 is a fragmentary cross sectional view showing the orientation between a casing and pole which will provide maximum torque.

In accordance with the present invention, the casing 11 and pole 12 of the hysteresis brake are adjusted relative to each other to provide a substantially predetermined torque at a predetermined substantially maximum input current for that type of hysteresis brake. In this respect, it is to be noted from FIG. 7 that the minimum torque is obtained when the slots 25 of casing 11 are directly opposite to slots 27 of pole 12 and teeth 29 of casing 11 are directly opposite to teeth 30 of pole 12. The maximum torque is obtained, as shown in FIG. 8, when slots 25 of casing 11 are directly opposite teeth 30 of pole 12 and slots 27 of pole 12 are directly opposite teeth 29 of casing 11. When the pole 12 and casing 11 of each of a plurality of identically constructed hysteresis brakes 10 are oriented for maximum torque, as in FIG. 8, the torques which will be obtained will differ at identical current inputs which are applied thereto because of the above-discussed variations due to tolerances and variations in magnetic characteristics of the materials. The foregoing is the case even when the casing and pole of each nominally identical hysteresis brake are offset the same angular amount relative to each other as in FIG. 9, the torque outputs at the same predetermined current inputs would still vary among a plurality of hysteresis brakes.

Figure 9:
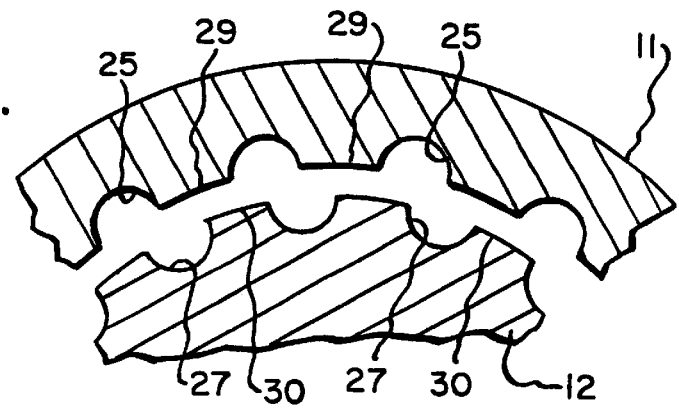
FIG. 9 is a fragmentary cross sectional view showing the orientation between a casing and pole which will provide a predetermined torque at a given current input.

In accordance with the present invention, a plurality of nominally identically constructed hysteresis brakes 10 can be standardized to compensate for variations due to manufacturing tolerances and variations in the magnetic characteristics of the materials. This standardization is obtained by calibrating each specific hysteresis brake 10 to produce a torque output which is substantially at T (FIG. 13) at a predetermined substantially maximum operating input current I by rotationally adjusting the casing 11 and pole 12 relative to each other to a position such as shown in FIG. 9, which is between the minimum torque position of FIG. 7 and the maximum torque position of FIG. 8. It will be understood that the relative rotational angular displacement between the casing 11 and pole 12 of each individual hysteresis brake 10 will not necessarily be the same although in certain instances it may be the same. The adjustment will be such as to produce the result such as shown in Graph I of FIG. 11 wherein each individual hysteresis brake 11 will produce a torque output substantially at T at a predetermined current input I, and a group of hysteresis brakes will provide torques which fall between curves B and $B_1$, which are relatively close to each other.

The structure for effecting rotational angular adjustment between the casing 11 and pole 12 of each individual hysteresis brake 10 and locking them in the adjusted position includes a plurality of set screws 31 which are received in tapped bores 32 spaced at 120° from each other in casing 11. In their locking position they are received in annular groove 33 of pole 12 to retain pole 12 and casing 11 in relative circumferential positions somewhere between the maximum torque position shown in FIG. 8 and the minimum torque position shown in FIG. 7, such as shown in FIG. 9.

During assembly of the casing 11 and pole 12, the set screws 31 are backed off, and the pole is inserted into the casing from right to left in FIG. 4. The pole 12 may be rotationally adjusted relative to casing 11 for maximum torque as shown in FIG. 8, and set screws are tightened by screwing them into groove 33. However, the pole and casing need not be set at a position for maximum torque. Thereafter, the rotor and shaft subassembly without the right bearing 15 thereon is inserted from left to right in FIG. 4, and thereafter the right bearing 15 and snap ring 23 are installed to complete the assembly.

The next step in the calibration is to secure pole 12 in a fixed position by fastening it to a suitable fixture (not shown). This is achieved by screws (not shown) connected to the fixture which are received in tapped bores 34 in pole 12. Thereafter, for a brake which is to operate in accordance with Graph I of FIG. 11, a predetermined maximum electrical current I is supplied to coil 13 through leads 35, and the screws 31 are loosened and the casing 11 is rotationally adjusted relative to pole 12 until the torque T at current I is at a desired value. The current I is at the high end of the current range at which the brakes are to operate. Thereafter, set screws 31 are tightened down to the condition shown in FIG. 4 to retain the casing 11 in its adjusted position relative to pole 12. It has been found that when the foregoing calibration procedure is performed at current I with a plurality of like hysteresis brakes 10, the torque outputs throughout the range of current inputs will vary only between curves B and $B_1$ of FIG. 11, which is much less than if the calibration was not effected in the above-described manner.

The calibration can be effected to produce between about 30% and 100% of the torque which is obtainable at the substantially maximum current at which the hysteresis brake is to operate. This is shown in FIGS. 10 and 11. In FIG. 10 the torque is about 325 for curve A at the substantially maximum current of 275 amps, and the torque for curve $A_1$ is about 350, and their torques below these maximums vary with the current as shown by the curves. Both of the brakes which are represented by curves A and $A_1$ can have their poles and casings adjusted relative to each other so that they will each produce a torque of substantially 250 at a substantially maximum current of 275 amps, as shown by Graph I in FIG. 11, and this will cause their individual hysteresis curves to fall between curves B and $B_1$ which is much closer than the differences between curves A and $A_1$. If desired, the pole and casings of a plurality of brakes can each be adjusted to give a torque $T_2$ of substantially 150 at the same current of 275 (Graph II), or a plurality of brakes can be adjusted to give a torque of substantially 80 at the same current of 275 (Graph III). All like brakes adjusted to substantially the same torque at the same current will have their torques fall within a narrow range depicted by the dotted lines in each of Graphs I, II, III and IV for each current at which the brake is to operate. Thus, it can be seen that brakes can be adjusted to give torques of between about 30% to 100% of their maximum torque at their substantially maximum operating currents. It will be appreciated that it is difficult to calibrate each hysteresis brake to produce exactly the same torque at a given current. It is for this reason that the above description refers to the torques being substantially at a given value. These values can vary up to a few percent from each other depending on the accuracy which is desired in the calibration.

The brakes of Graphs I, II and III were calibrated at the high end of the operable current range. However, under certain circumstances it may be desired to calibrate the brakes at a current which is far below the high end of the current range at which the brake can operate. In the foregoing respect, Graph IV of FIG. 10 depicts adjusting brakes to produce a torque $T_1$, at a current $I_1$, which is lower than the substantially maximum current I at which the brakes can operate. The reason for calibrating at a much lower current than the high end of the current range is so that the brakes will operate at lower temperatures during their normal operating range which is at currents below $I_1$. In this case also, the torque of like brakes will be in a narrower range than if the calibration was not effected in the foregoing manner.

As can be seen from FIG. 4A, the side 37 of V-shaped groove 33 is oriented so that as the conical tips of set screws 31 enter groove 33 they will cam the pole 12 to the left in FIG. 4 relative to casing 11 to thereby cause rim portion 39 of pole 12 to engage end 40 of casing 11.

An alternate type of adjustment between a pole 12' and a casing 11' is shown in FIGS. 12–14 wherein the end portion 41 of casing 11' is tapped at 42 to receive the shanks of screws 43, the heads 44 of which bear on countersunk arcuate surface 45 of pole 12' which surrounds arcuate slot 47. As can be seen, there are three screws 43 oriented at 120° relative to each other. In the embodiment of FIGS. 12–14, as in the previous embodiments, the casing 11' and pole 12' are initially adjusted relative to each other in the maximum torque position of FIG. 8 while screws 43 are loose and thereafter they are rotationally adjusted relative to each other to provide the result of FIG. 11 whereupon screws 43 are tightened to retain the casing and pole in the adjusted position which is desired. Also the tightening of screws 43 draws the rim portion 49 of the pole into engagement with end surface 50 of the casing.

It can thus be seen that the improved hysteresis brake 10 of the present invention contains structure which permits it to be adjusted to provide a torque output of a substantially predetermined value at a predetermined substantially maximum current input so that when a plurality of nominally like constructed hysteresis brakes are calibrated, their torque characteristics in the current range up to their substantially maximum current at which they were calibrated will not vary significantly from each other. Also the calibration can be effected for a plurality of brakes at less than the substantially maximum current, that is, at any current up to the high end of the current range. The foregoing calibrating structure thus overcomes variations of nominally like hysteresis brakes due to various factors including manufacturing variations and variations in the magnetic characteristics of the materials.

While preferred embodiments of the present invention have been disclosed, it will be appreciated that the present invention is not limited thereto but may be otherwise embodied within the scope of the following claims.

What is claimed is:

1. A plurality of nominally identical hysteresis brakes of substantially the same construction with each brake providing substantially the same torque output at substantially the same operating current within its operating range notwithstanding their differences due to manufacturing tolerances and variations in magnetic characteristics comprising a casing on each of said hysteresis brakes, internal alternating first slots and first teeth on each of said casings, a pole on each of said hysteresis brakes, external alternating second slots and second teeth on each of said poles, said first slots and teeth of each of said casings being spaced radially outwardly from said second slots and teeth of its respective pole, a rotor on each of said hysteresis brakes including an annular portion spaced between said first and second slots and teeth on each of said hysteresis brakes, and locking means for locking each of said poles in a circumferentially adjusted position relative to its respective casing to cause said first and second slots and teeth of each of said hysteresis brakes to be in different adjusted positions to produce in each of said hysteresis brakes a torque of a substantially predetermined value at a calibrating current and thus produce torque curves within said plurality of hysteresis brakes which fall within a range which is much closer than the range which is obtainable by orienting the pole and casing of each of said hysteresis brakes in the same relative orientation to thereby cause each of said hysteresis brakes to produce substantially the same torque output at substantially the same operating current within its operating range notwithstanding said differences due to manufacturing tolerances and magnetic characteristics.

2. A plurality of hysteresis brakes as set forth in claim 1 wherein said calibrating current is at the high end of the current range at which said brakes are to operate.

3. A plurality of hysteresis brakes as set forth in claim 1 wherein said locking means comprises circumferential surface means on each of said poles, and screw means in each of said casings for engaging its respective circumferential surface means, said circumferential surface means being sufficiently wider than said screw means to permit obtaining said circumferentially adjusted position by effecting relative rotation between the casing and pole of each of said hysteresis brakes an undefined circumferential amount and locking said casing and pole in said adjusted position.

4. A plurality of hysteresis brakes as set forth in claim 3 wherein said circumferential surface means comprises circumferential groove means in each of said poles.

5. A plurality of hysteresis brakes as set forth in claim 4 wherein said screw means comprises a plurality of set screws for circumferential adjustment within said circumferential groove means.

6. A plurality of hysteresis brakes as set forth in claim 5 wherein each of said circumferential groove means includes an inclined wall, and wherein said set screws engage said inclined wall to exert an axial camming action between said casing and said pole.

7. A plurality of hysteresis brakes as set forth in claim 6 wherein each of said poles includes a circumferentially extending outer rim portion, and wherein said casing includes an end surface, and wherein said axial camming action draws said outer rim portion toward its respective end surface.

8. A plurality of hysteresis brakes as set forth in claim 1 wherein each of said poles includes a radially extending surface, arcuate slot means in each of said radially extending surfaces, and wherein each of said casings includes an end surface in contiguous relationship to said arcuate slot means, and screw means extending through said arcuate slot means and into each of said end surfaces for drawing its respective radially extending surface toward its respective end surface and for securing each of said radially extending surfaces in circumferentially adjusted positions relative to its respective end surface.

9. A plurality of hysteresis brakes as set forth in claim 1 wherein said calibrating current is a current which is far below the high end of the current range.

10. A plurality of hysteresis brakes as set forth in claim 1 wherein said calibrating current is the same current applied to each of said hysteresis brakes within the current range of each of said hysteresis brakes.

11. A plurality of hysteresis brakes as set forth in claim 1 wherein said plurality of brakes are calibrated at substantially maximum current to each produce between about 30% and 100% of the torque which is obtainable at said substantially maximum current.

12. A plurality of nominally identical hysteresis brakes of substantially the same construction with each brake providing substantially the same torque output at substantially the same operating current within its operating range notwithstanding their differences due to manufacturing tolerances and variations in magnetic characteristics comprising a casing on each of said hysteresis brakes, internal alternating first slots and first teeth on each of said casings, a pole on each of said hysteresis brakes, external alternating second slots and second teeth on each of said poles, said first slots and teeth of each of said casings being spaced radially outwardly from said second slots and teeth of its respective pole, a rotor on each of said hysteresis brakes including an annular portion spaced between said first and second slots and teeth on each of said hysteresis brakes, and locking means for locking each of said poles of each of said hysteresis brakes in a circumferentially adjusted position relative to its respective casing which is different from the circumferentially adjusted position of the pole relative to its casing of another of said hysteresis brakes to cause said first and second slots and teeth of each of said hysteresis brakes to be located relative to each other in said different adjusted position to produce in each of said hysteresis brakes a torque of a substantially predetermined value at a calibrating current and thus produce torque curves within said plurality of hysteresis brakes which fall within a range which is much closer than the range which is obtainable by orienting the pole and casing of each of said hysteresis brakes in the same relative orientation to thereby cause each of said hysteresis brakes to produce substantially the same torque output at substantially the same operating current within its operating range notwithstanding said differences due to manufacturing tolerances and magnetic characteristics.

13. A plurality of nominally identical hysteresis brakes of substantially the same construction with each brake providing substantially the same torque output at substantially the same operating current within its operating range notwithstanding their differences due to manufacturing tolerances and variations in magnetic characteristics comprising a casing on each of said hysteresis brakes, internal alternating first slots and first teeth on each of said casings, a pole on each of said hysteresis brakes, external alternating second slots and second teeth on each of said poles, said first slots and teeth of each of said casings being spaced radially outwardly from said second slots and teeth of its respective pole, a rotor on each of said hysteresis brakes including an annular portion spaced between said first and second slots and teeth on each of said hysteresis brakes, and said poles of each of said hysteresis brakes being in a circumferentially adjusted position relative to its respective casing which is different from the circumferentially adjusted position of the pole relative to its casing of other of said hysteresis brakes to produce in each of said hysteresis brakes a torque of a substantially predetermined value at a calibrating current and thus produce torque curves within said plurality of hysteresis brakes which fall within a range which is much closer than the range which is obtainable by orienting the pole and casing of each of said hysteresis brakes in the same relative orientation to thereby cause each of said hysteresis brakes to produce substantially the same torque output at substantially the same operating current within its operating range notwithstanding said differences due to manufacturing tolerances and magnetic characteristics.

14. A plurality of nominally identical hysteresis brakes of substantially the same construction with each brake providing substantially the same torque output at substantially the same operating current within its operating range notwithstanding their differences due to manufacturing tolerances and variations in magnetic characteristics comprising a casing on each of said hysteresis brakes, internal alternating first slots and first teeth on each of said casings, a pole on each of said hysteresis brakes, external alternating second slots and second teeth on each of said poles, said first slots and teeth of each of said casings being spaced radially outwardly from said second slots and teeth of its respective pole, a rotor on each of said hysteresis brakes including an annular portion spaced between said first and second slots and teeth on each of said hysteresis brakes, and locking means for locking each of said poles in a circumferentially adjusted position relative to its respective casing to cause said first and second slots and teeth of each of said hysteresis brakes to be located relative to each other in said adjusted position which is not necessarily the same as the adjusted positions of other of said slots and teeth of other of said hysteresis brakes to produce in each of said hysteresis brakes a torque of a substantially predetermined value at a calibrating current and thus produce torque curves within said plurality of hysteresis brakes which fall within a range which is much closer than the range which is obtainable by orienting the pole and casing of each of said hysteresis brakes in the same relative orientation to thereby cause each of said hysteresis brakes to produce substantially the same torque output at substantially the same operating current within its operating range notwithstanding said differences due to manufacturing tolerances and magnetic characteristics, each of said poles including a radially extending surface, arcuate slot means in each of said radially extending surfaces, each of said casings including an end surface in contiguous relationship to said arcuate slot means, and screw means extending through said arcuate slot means and into each of said end surfaces for drawing its respective radially extending surface toward its respective end surface and for securing each of said radially extending surfaces in circumferentially adjusted positions relative to its respective end surface.

15. A plurality of hysteresis brakes as set forth in claim 14 wherein said calibrating current is at the high end of the current range at which said brakes are to operate.

16. A plurality of hysteresis brakes as set forth in claim 14 wherein said calibrating current is a current which is far below the high end of the current range.

17. A plurality of hysteresis brakes as set forth in claim 14 wherein said calibrating current is the same current applied to each of said hysteresis brakes within the current range of each of said hysteresis brakes.

18. A plurality of hysteresis brakes as set forth in claim 14 wherein said plurality of brakes are calibrated at substantially maximum current to each produce between about 30% and 100% of the torque which is obtainable at said substantially maximum current.

* * * * *